United States Patent [19]

Levinrad

[11] Patent Number: 5,618,991
[45] Date of Patent: Apr. 8, 1997

[54] BICYCLE INNER TUBE LEAK DETECTOR DEVICE

[75] Inventor: Maxim D. Levinrad, Van Nuys, Calif.

[73] Assignees: Moshe Young, Studio City; Maxim Levinrad, Van Nuys, both of Calif.

[21] Appl. No.: 585,520

[22] Filed: Jan. 16, 1996

[51] Int. Cl.$^6$ .................................................. G01M 3/02
[52] U.S. Cl. ................................... 73/40.7; 23/40.7
[58] Field of Search ........................................ 73/40, 40.7

[56] References Cited

U.S. PATENT DOCUMENTS 5,106,759   4/1992   Addison .................................. 436/178

*Primary Examiner*—Hezron E. Williams
*Assistant Examiner*—Jay L. Politzer
*Attorney, Agent, or Firm*—Daniel R. Kimbell

[57] ABSTRACT

An inner tube leak detection device. The device has a sleeve member with two semi-tubal halves which are hinged, or alternately a single unit with a slot formed therein. The sleeve member has an outer wall, an inner wall, side walls joining the outer and inner wall, and end caps defining an interior chamber therein. The inner wall has air openings formed therethrough. The interior chamber is further divided into subchambers by interior dividing screen. A number of lightweight particles are contained within the subchambers of the interior chamber. When the device is placed around an inner tube with a leak, air flowing through the leak will cause the lightweight particles to be agitated, thereby providing a clear visual indication, and often an audible indication the location of the leak.

16 Claims, 2 Drawing Sheets

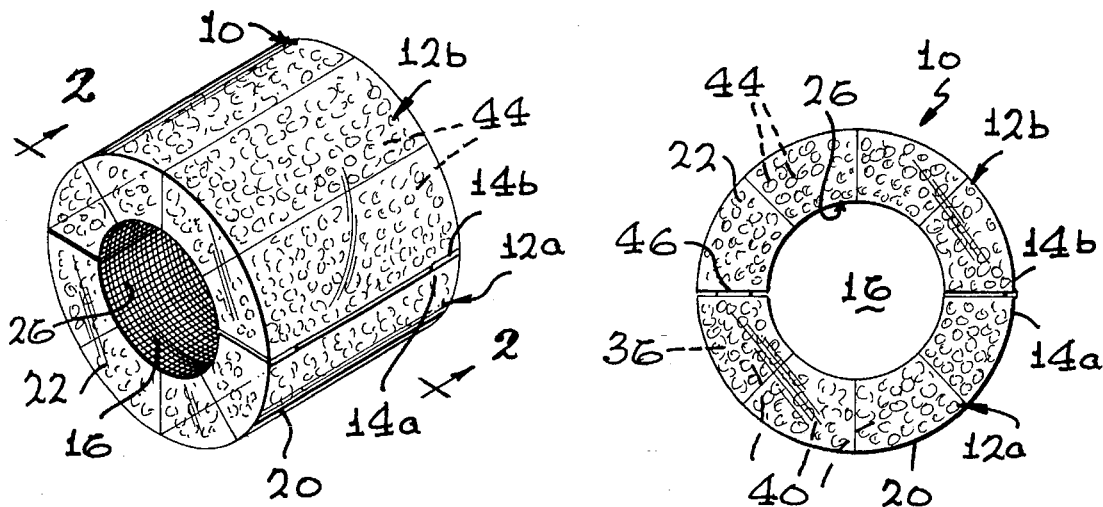
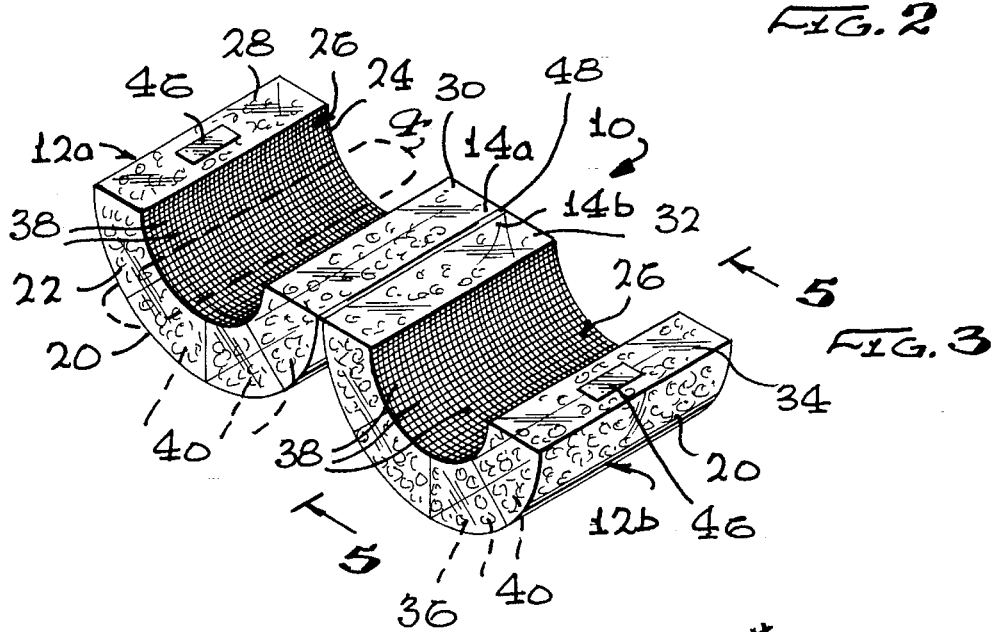
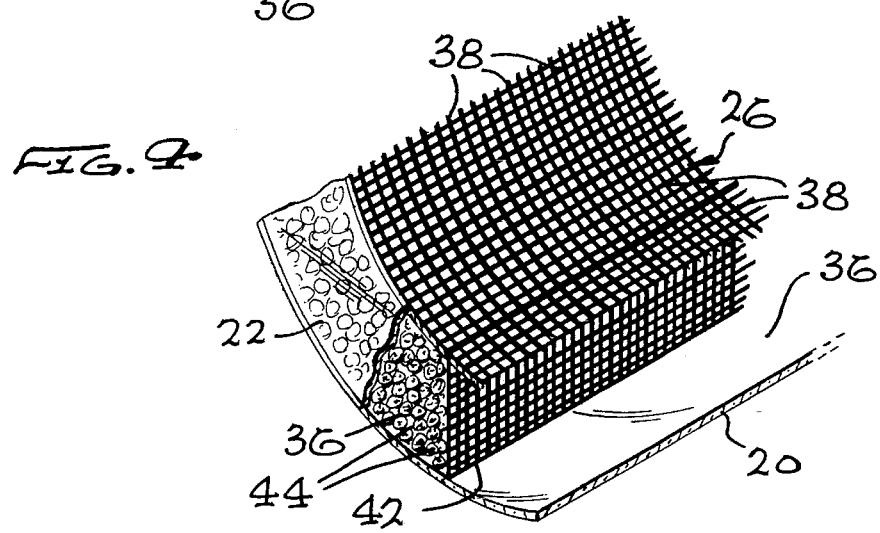

BICYCLE INNER TUBE LEAK DETECTOR DEVICE

BACKGROUND OF THE INVENTION

The invention relates to leak detection devices, and more particularly to devices for use in locating leaks in bicycle inner tubes. The usual procedure to detect leaks in an inner tube is to immerse the inflated inner tube in a water tank and locate the leak by noting the position on the inner tube from which bubbles emerge. While this procedure is effective, it is somewhat cumbersome and troublesome and cannot be performed on the road where flats typically occurs. While it is sometimes possible to detect the location of a leak by listening for the sound of air escaping from the puncture, this is impractical on the road due to the noise of traffic and wind. Cyclist, particularly sports cyclists, who often embark on long trips, opt to carry several spare tubes rather than attempt to patch the tubes on the road, thus sacrificing space and weight. Even then, they must hope that they will have more spare tubes than punctures. On the other hand, if the cyclist was able to easily locate the location of a leak, an immediate repair can be simply effected.

U.S. Pat. Nos. 4,612,798 and 4,693,118 to Roberts disclose pneumatic tire leak detectors and methods which relie on a cannister of fluorescent powder, which when propelled into the leaking inner tube, will escape from the leak, and positively indicate the leak's location on the tube. While the device of the Roberts patents might be acceptable for large, automobile tires for which repairs are invariably made at a shop, and the cannister can be easily carried and stored, the Roberts device would not be convenient for a bicyclist to use and carry, due to its size and weight, and the mess created by the escaping fluorescent powder, which may also interfer with adhesion of the tire patches.

In view of the foregoing, there remains a need for a device to easily detect the location of an air leak in bicycle inner tubes while on the road, as well as in other circumstances as required.

SUMMARY OF THE INVENTION

The present invention relates to a device for localizing leaks in bicycle inner tubes which does not require that the inner tube be immersed in a water tank, and which is sufficiently compact and light to be easily carried and used by a cyclist on the road.

It is a primary object of the invention to provide an improved means to locate a leak in a bicycle inner tube.

It is another object of the invention to provide a visual means to detect the location of a leak. It is a further object of the invention to provide a small light-weight apparatus for localizing air leaks that may conveniently be carried by a sport cyclist for use on the road. It is yet another object of the invention to provide a means of observing the location of an air leak utilizing a plurality of lightweight particles which will be caused to be agitated when subjected to escaping air from a punctured inner tube.

It is yet a further object of the invention to provide the means of packing a small repair kit in the apparatus, when not in use, so that after detecting the location of the leak, an immediate repair may be effected.

These and further objectives of the invention are meet by providing an inner tube leak detection device comprising:

a sleeve member with an outer wall and an inner wall defining an interior chamber therein, said inner wall having air openings formed therethrough; and a plurality of lightweight particles contained within said interior chamber.

These objectives are further met by providing an inner tube leak detection device comprising:

a sleeve member comprises two semi-tubal halves which are hinged, each half having an outer wall, an inner wall, side walls joining said outer and inner wall, and end caps defining an interior chamber therein, said inner wall having air openings formed therethrough; and a plurality of lightweight particles contained within said interior chamber.

BRIEF DESCRIPTION OF THE DRAWINGS

FIG. 1 is a perspective view of a leak detecting device, in its closed position.

FIG. 2 is a cross-sectional view of the device of FIG. 1, through view lines 2—2 of FIG. 1.

FIG. 3 is a perspective view of the leak detecting device of FIG. 1, in its opened position.

FIG. 4 is a detailed perspective view in the circled area 4—4 of FIG. 3, showing the inner air flowable wall of the device.

DESCRIPTION OF A PREFERRED EMBODIMENT

Figure 5:
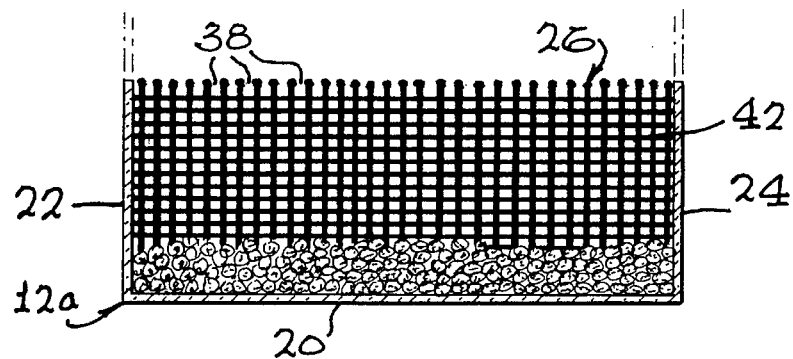
FIG. 5 is a cross-sectional view of one section of the device through view lines 5—5 of FIG. 3.
Figure 6:
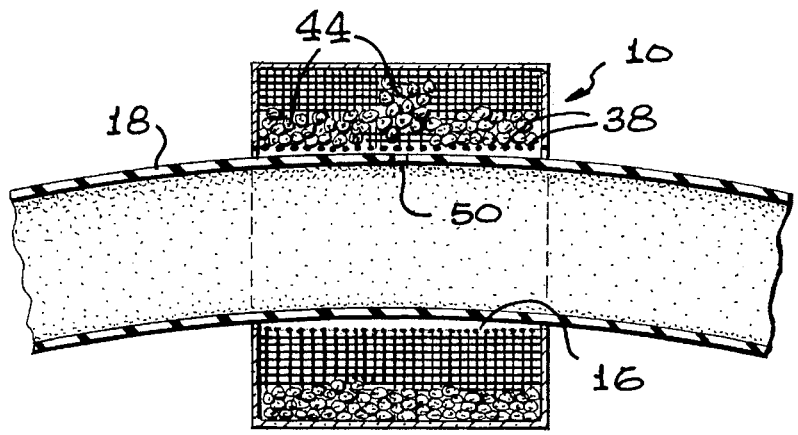
FIG. 6 is a cross-sectional view of an inner tube with a plan view of the apparatus positioned on the inner tube and being used to localize a puncture on the inner tube.

The invention is best shown with respect to the drawings, as follows:

Referring to FIGS. 1–7, various views of the first embodiment of the leak detecting and localizing device 10 of the invention is shown. Referring to FIGS. 1–3, the leak localizing device 10 has two connectable halves 12a and 12b, preferably hinged together at hinging sides 14a and 14b to form a sleeve-like member 10. Each of the halves 12a and 12b are preferably formed in a semi-tubal shape, having an inner open area 16, into which an inner tube 18 is adapted to be placed, as is best shown in FIG. 6.

Each half 12a and 12b has an outer wall 20 with two side walls 22 and 24. The outer wall 20 and the two side walls 22 and 24 are preferably made of transparent material, such as clear plastic. An inner wall 26 extends between the two side walls 22 and 24. End caps 28, 30, 32 and 34 are located on the ends of the two hinged together halves 12a and 12b, to thereby form an interior chamber 36 within the interior of the outer wall 20, the side walls 22 and 24, the inner wall 26, and the end caps 28 and 30, and 32 and 34, in each of the halves 12a and 12b. Referring to FIGS. 3–5, the inner wall 26 has a plurality of air passages 38 formed therethrough to allow air to pass freely through the inner tube 18. The inner wall 26 can be conveniently formed of a mesh material such as wire or plastic mesh if desired.

The interior chamber 36 is also preferably divided into two, and preferably three, four or more subchambers 40 by separation walls 42, which are preferably formed of a mesh material, such as that used in forming the inner walls 26. Contained within the interior subchambers 40 are a large number of lightweight particles 44. These lightweight particles 44 can comprise items such as Styrofoam granules, vermiculite, or other items, such as feathers, or other air blowable particles 44. The use of subchambers 40 prevent the lightweight particles 44 from falling to one end of the halves 12a and 12b, and help ensure that the lightweight particles 44 are relatively equally distributed around the device 10, and always close to any leak to be detected in an inner tube 18.

Referring to FIGS. 2 and 3, detachable attachment means 46 are located on the end caps 28 and 34, to detachably attach the two halves 12a and 12b together in a closed position, as shown FIGS. 2 and 6. These detachable attachment means 46 can comprise magnets, complementary hook and loop material, snaps, or other known means. Alternately, the device can be fitted with a hinge means 48 which exerts a closing, biasing force, so that the two halves 12a and 12b tend to be biased to a closed position. The detachable attachment means 46 keeps the device 10 closed when not in use and when positioned around the inner tube 16.

Referring to FIG. 6, the use of the device 10 to detect the location of a leak 50 in the inner tube 16 is shown. The inner tube 16 is placed in the inner open area 16 of the device 10. The inner tube 16 is then inflated and the device 10 is moved around the inner tube 16 until movement is seen in the Styrofoam granules 44. When the device 10 is placed over the location of the leak 50, the air escaping from the leak 50 passes through the openings 38 in the inner wall 26, and causes the lightweight particles 44 to be visibly agitated and blow around in the subchambers 40. This blowing around also creates an audible sound. Even in high noise or high wind conditions, the device 10 functions well.

Figure 7:
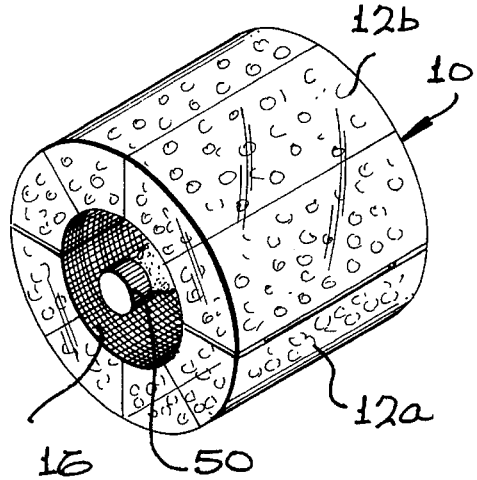
FIG. 7 is a perspective view of a leak detecting device, in its closed position, with a repair kit stored in its interior.

FIG. 7. shows a repair kit 50 in position in the inner open area 16 of the two halves 12a and 12b when the unit is not in use.

Figure 8:
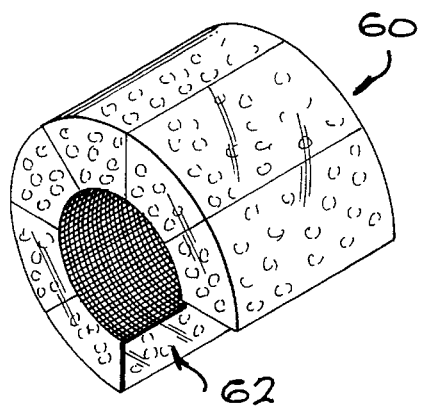
FIG. 8 is a perspective view of a second embodiment of the device of the invention.

Now referring to FIG. 8, a second embodiment of the leak detection and localizing device 60 is shown. This second embodiment of the device 60 is a simplified version of the first embodiment 10, and has the same construction, except that instead of comprising two hinged halves, it comprises a single section, with a slot shaped opening 62 through which an inner tube can pass. The device 60 is used in the same manner as the first embodiment 10, with the provision that the opening 62 be placed toward an outside circumferential region of the inner tube 16. Since the outer circumferential region of the inner tube 16 is typically where leaks occur, this second embodiment 60 functions well.

The drawings and the foregoing description are not intended to represent the only form of the invention in regard to the details of this construction and manner of operation. In fact, it will be evident to one skilled in the art that modifications and variations may be made without departing from the spirit and scope of the invention. Although specific terms have been employed, they are intended in a generic and descriptive sense only and not for the purpose of limitation, the scope of the invention being delineated in the following claims which follow.

I claim:

1. An inner tube leak detection device comprising:
   a sleeve member with an outer wall and an inner wall defining an interior chamber therein and defining an inner opening in a center thereof adapted to receive an inner tube, said inner wall having air openings formed therethrough; and
   a plurality of lightweight particles contained within said interior chamber.

2. The inner tube leak detection device of claim 1, wherein said sleeve member comprises a cylindrical shape with said inner opening in a center thereof is adapted to receive an inner tube.

3. The inner tube leak detection device of claim 1, wherein said sleeve member comprises two semi-tubal halves which are hinged together.

4. The inner tube leak detection device of claim 3, wherein said two semi-tubal halves further comprise detachable attachment means.

5. The inner tube leak detection device of claim 1, wherein said interior chamber is divided into a plurality of subchambers by dividing walls permeated with air openings, with said lightweight particles contained in said subchambers.

6. The inner tube leak detection device of claim 1, wherein said sleeve member is comprised of clear plastic material.

7. The inner tube leak detection device of claim 1, wherein said lightweight particles comprise Styrofoam granules.

8. The inner tube leak detection device of claim 1, wherein said inner wall comprises mesh material.

9. The inner tube leak detection device of claim 1, wherein said sleeve member further comprises side walls and end caps.

10. The inner tube leak detection device of claim 1, wherein said sleeve member comprises a single, generally tubal unit, with a slot formed therein to receive an inner tube.

11. An inner tube leak detection device comprising:
    a sleeve member comprised of two semi-tubal halves which are hinged, each half having an outer wall, an inner wall, side walls joining said outer and inner wall, and end caps, defining an interior chamber therein, said inner wall having air openings formed therethrough; and
    a plurality of lightweight particles contained within said interior chamber.

12. The inner tube leak detection device of claim 11, wherein said two semi-tubal halves further comprise detachable attachment means.

13. The inner tube leak detection device of claim 11, wherein said interior chamber is divided into a plurality of subchambers by dividing walls permeated with air openings, where said lightweight particles are contained in said subchambers.

14. The inner tube leak detection device of claim 11, wherein said sleeve member is comprised of clear plastic material.

15. The inner tube leak detection device of claim 11, wherein said lightweight particles comprise Styrofoam granules.

16. The inner tube leak detection device of claim 11, wherein said inner wall comprises mesh material.

\* \* \* \* \*